6 Sheets—Sheet 1.

F. E. HERDMAN.

ELECTRIC ELEVATOR.

No. 11,408. Reissued Mar. 27, 1894.

WITNESSES:
David S. Williams
Frank S. Busser

INVENTOR:
Frank E. Herdman
by his atty.
G. P. Harding

F. E. HERDMAN.

ELECTRIC ELEVATOR.

No. 11,408. Reissued Mar. 27, 1894.

WITNESSES:
David S. Williamson
Frank S. Busser

INVENTOR:
Frank E. Herdman
by his atty
J. F. Harding

6 Sheets—Sheet 3.

F. E. HERDMAN.

ELECTRIC ELEVATOR.

No. 11,408. Reissued Mar. 27, 1894.

WITNESSES:

Frank S. Burson

INVENTOR:

Frank E. Herdman by his atty

G. H. Harding

6 Sheets—Sheet 4.
F. E. HERDMAN.
ELECTRIC ELEVATOR.
No. 11,408. Reissued Mar. 27, 1894.
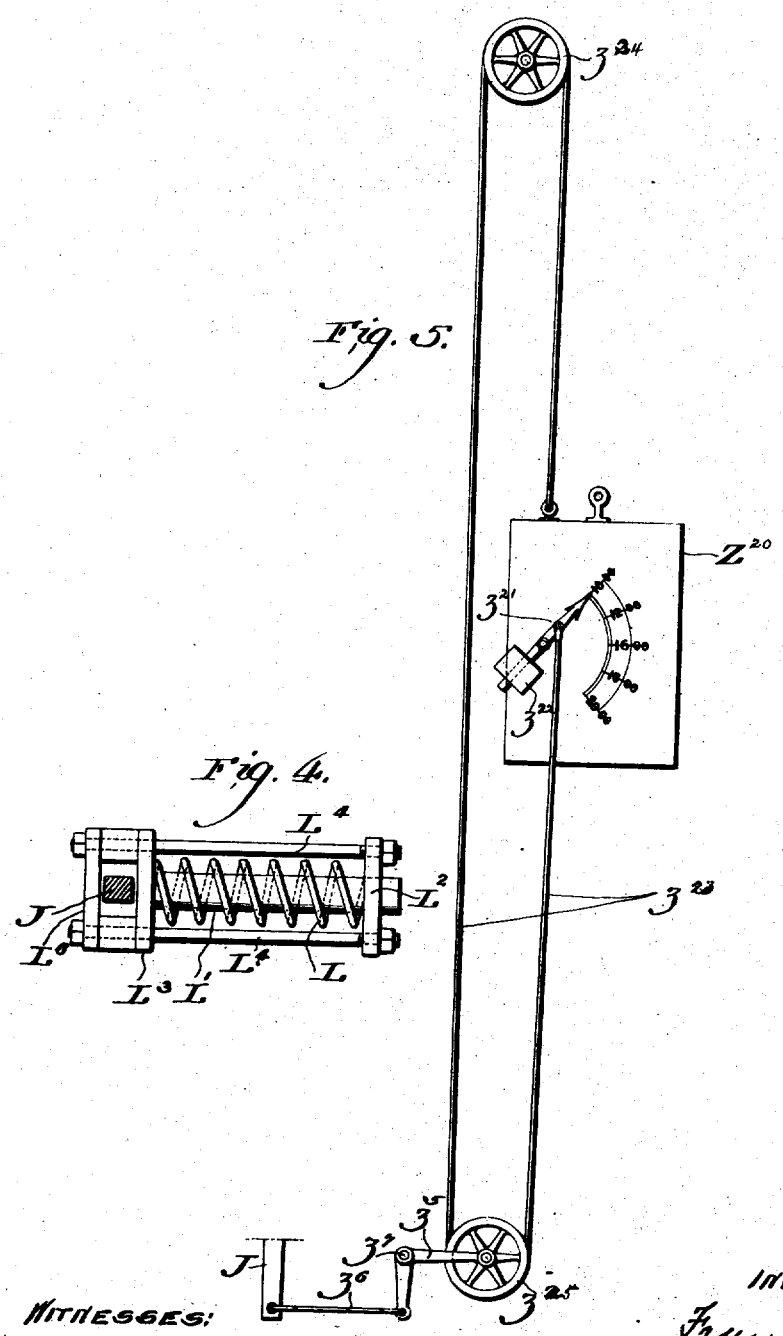
WITNESSES:
Louis F. Williamson
Frank S. Bussau
INVENTOR:
Frank E. Herdman
by his Atty
G. P. Harding

F. E. HERDMAN.

6 Sheets—Sheet 5.

ELECTRIC ELEVATOR.

No. 11,408.

Reissued Mar. 27, 1894.

WITNESSES:
David S. Williamson
Frank S. Busser

INVENTOR:
Frank E. Herdman
by his atty
J. H. Hardinge

F. E. HERDMAN.

6 Sheets—Sheet 6.

ELECTRIC ELEVATOR.

No. 11,408.

Reissued Mar. 27, 1894.

Witnesses:

Jesse B. Heller.

Frank S. Brown

Inventor.

Frank E. Herdman by G. H. Harding

Attorney.

UNITED STATES PATENT OFFICE.

FRANK E. HERDMAN, OF WINNETKA, ILLINOIS, ASSIGNOR TO THE PREMIER STEEL COMPANY, OF INDIANA

ELECTRIC ELEVATOR.

SPECIFICATION forming part of Reissued Letters Patent No. 11,408, dated March 27, 1894.

Original No. 466,037, dated December 29, 1891. Application for reissue filed November 27, 1893. Serial No. 492,154.

DIVISION A.

*To all whom it may concern:*

Be it known that I, FRANK E. HERDMAN, a citizen of the United States, residing at Winnetka, in the county of Cook and State of Illinois, formerly residing at Indianapolis, county of Marion, and State of Indiana, have invented a new and useful Improvement in Elevators, of which the following is a full, clear, and exact description, reference being had to the accompanying drawings, which form a part of this specification.

Figure 1:
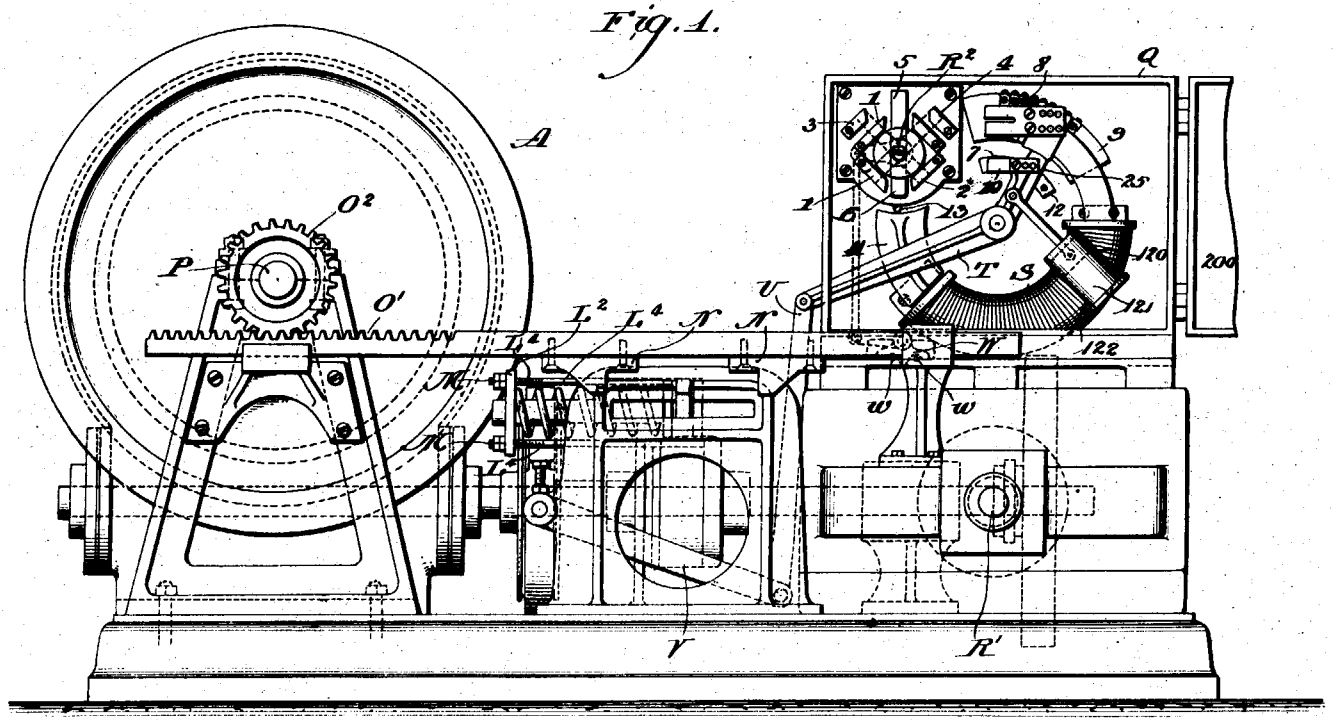
Figure 2:
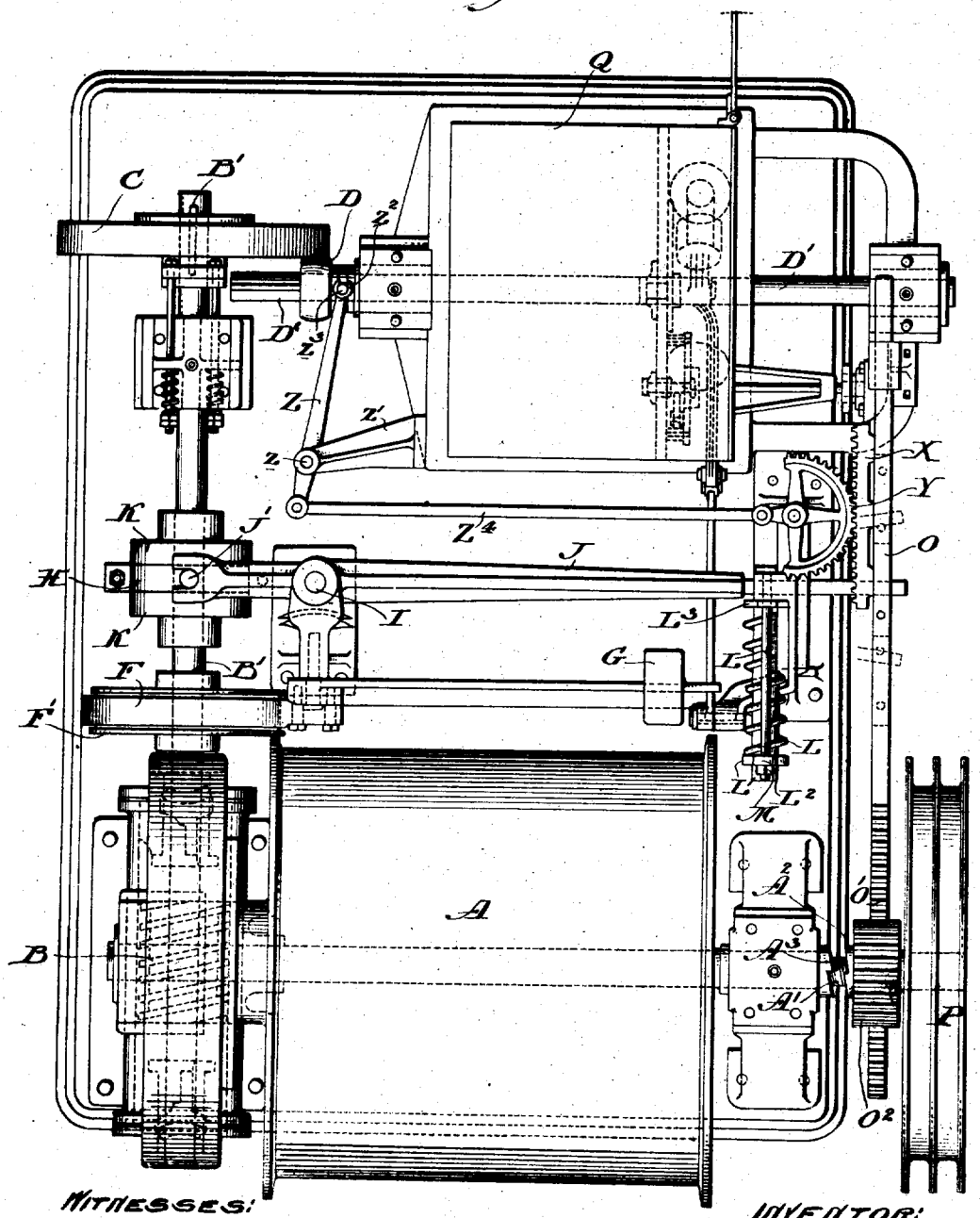
Figure 3:
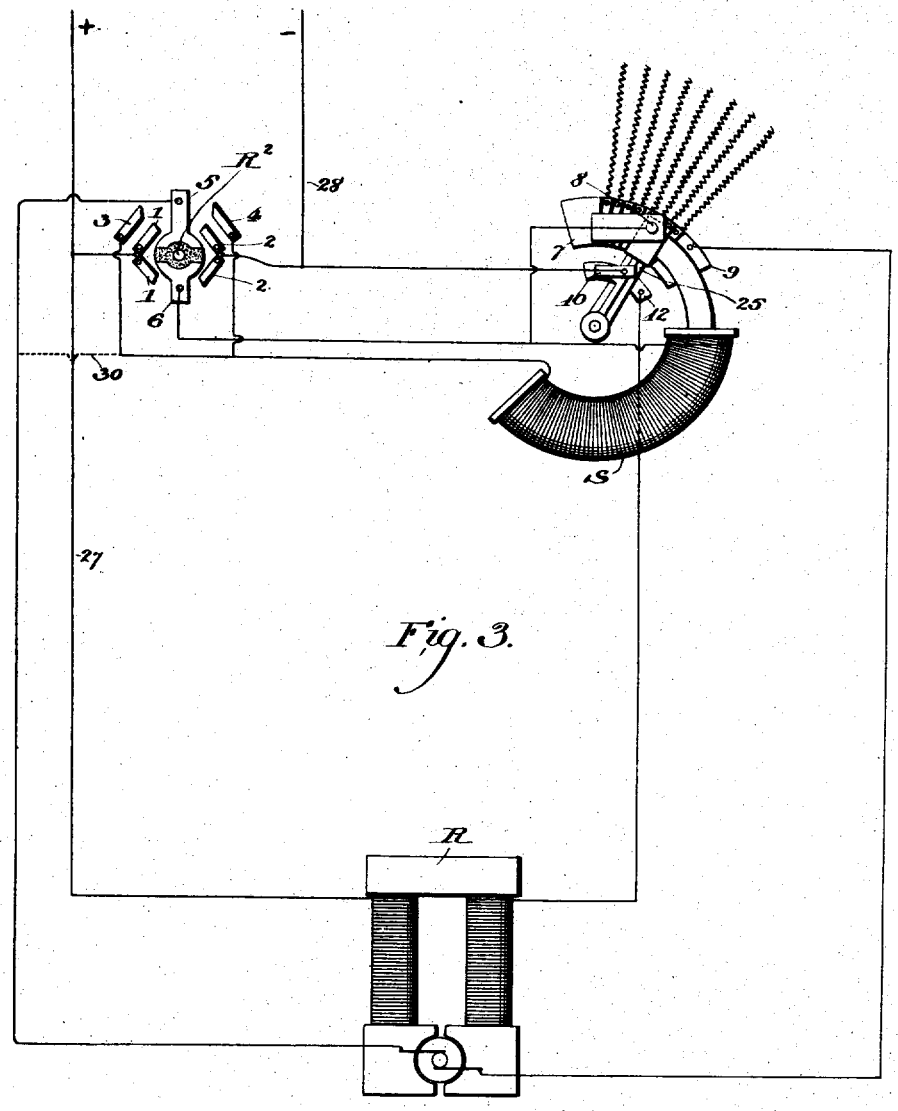
Figure 6:
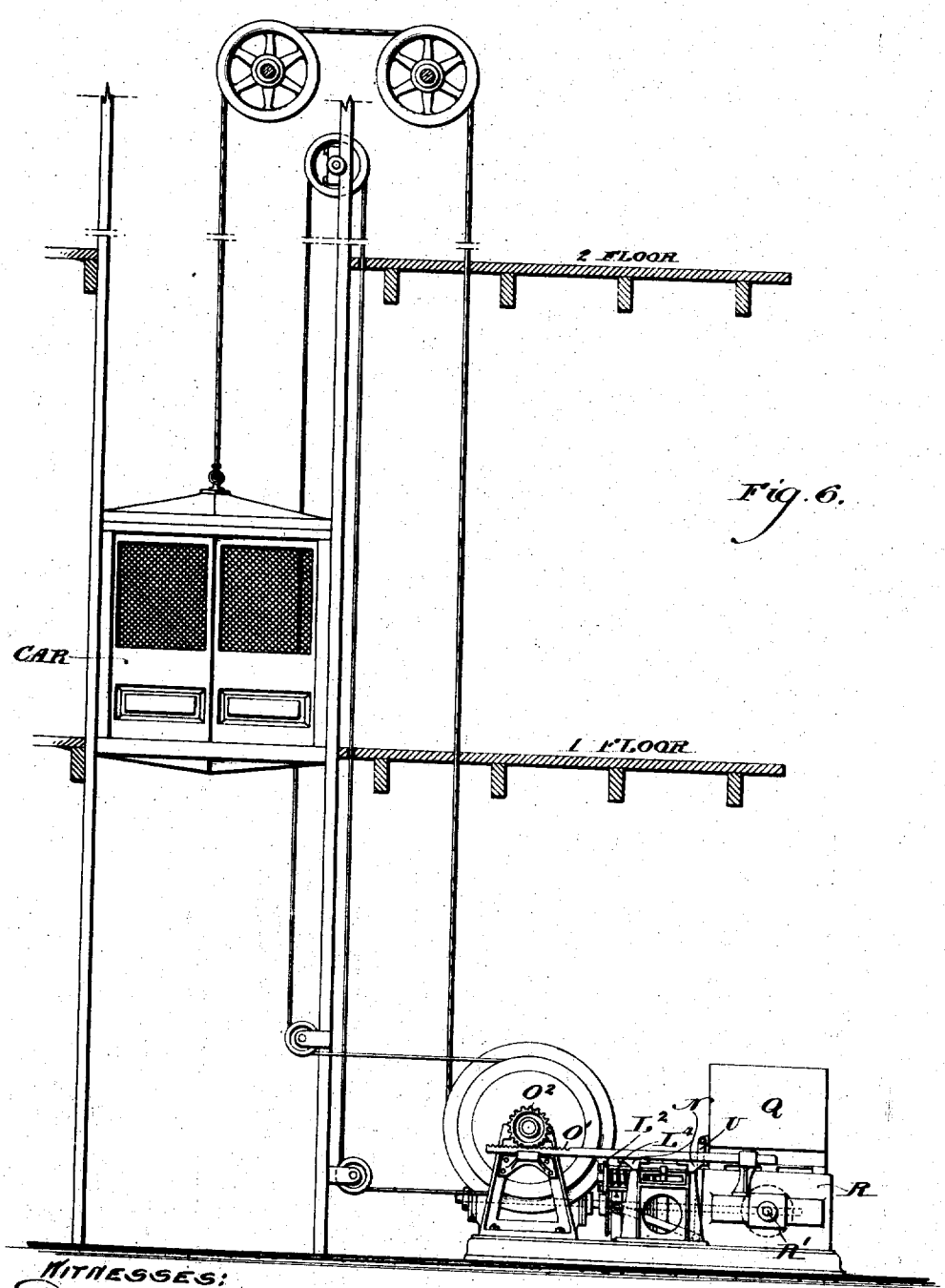
Figure 7:
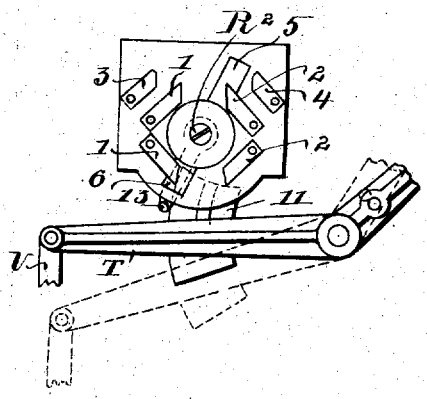
Figure 8:
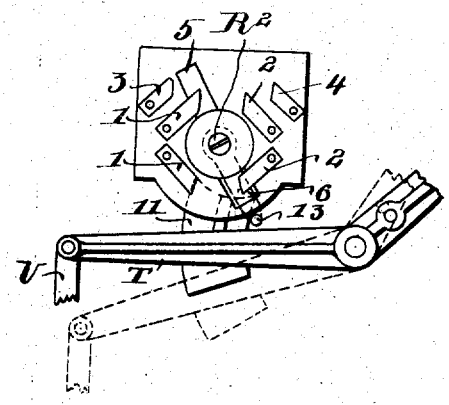
Figure 9:
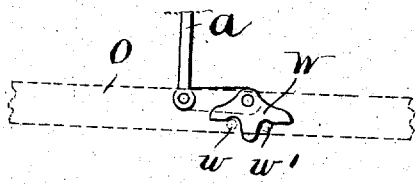

In the drawings, Figure 1 is a side elevation of elevator operating mechanism. Fig. 2 is a plan view of same. Fig. 3 is a diagrammatic view of solenoid, switches, and motor. Fig. 4 is a detail sectional view of weighing-lever tension apparatus. Fig. 5 is a detail view of indicating device in connection with weighing-lever. Fig. 6 is a front elevation of elevator and operating mechanism for the same. Figs. 7 and 8 are detailed views showing locking of the switch when the circuit to the solenoid is broken. Fig. 9 is a detached view showing mechanism on operating bar for opening the switch.

Similar letters and figures denote similar parts.

A is the operating-drum, driven by the worm B on the shaft B′. On the other end of the shaft is the friction-wheel C, which is sleeved on the shaft B′, and is provided with the tension device, which in this case is a spring, although a weighted lever may be substituted for the spring.

D′ is the driving shaft, and sleeved upon said shaft is the friction-wheel D.

Z is a lever fulcrumed at $z$, which is connected to the support $z'$. This lever Z has the forked end $z^2$, which surrounds the pin $z^3$, connected to the sleeve of the friction-wheel D.

$Z^4$ is a connecting-rod connecting the lever Z and the gear-wheel Y, the gear-wheel Y working in the rack X, which is upon the operating-bar O. This bar terminates in the rack O′, which works in the gear-wheel $O^2$ upon the shaft of the operating-sheave P.

F′ is a wheel upon the shaft of the worm B, and F is the brake, having the weight G at the end of its lever.

H is a loose collar between the fixed collars K K upon the worm-shaft B′.

J′ is a pin upon the loose collar H, and J is a lever provided with the forked end which surrounds the pin J′. I do not limit myself to the exact connection between the worm and lever J, except wherein the same is specifically claimed. The lever J is fulcrumed at I, and the end-thrust of the movement of the worm or screw in either direction is taken up by this loose collar H, and the movement of this loose collar tends to move the lever J in either direction—that is, to the right or to the left. Near the lower end of the lever J is attached a spring L, which surrounds the rod L′.

$L^2$ $L^3$ are two yokes which surround the rod L′, the yoke $L^2$ being loose upon the rod L′ and the yoke $L^3$ fixed. These yokes are connected together by the rods $L^4$, and the rods $L^4$ pass through the yoke $L^3$ and through the yoke $L^6$ and are connected to yoke $L^2$. The lever J passes between the yokes $L^3$ $L^6$, so that the movement of the lever J tends to compress the spring L—that is, the movement of lever J has to be against the spring L. The amount of tension or the amount of power exerted by this spring is regulated by turning the nuts M on the end of rod $L^4$, which compresses more or less the spring L by moving yoke $L^2$ and rod L′.

N N are two stops on the operating-bar O.

By means of the lever J, I am enabled to regulate the operation or movement of the elevator, so as to prevent its becoming overloaded. Thus if fifteen hundred pounds is the capacity of the machine at its highest speed the spring would be tightened by the nut M until the lever J would be left in its central position with this load, and the operator could then move the friction-wheel D to its greatest throw—that is, so as to get the greatest differential speed between the shaft of the motor or the friction-wheel D and the friction-wheel C. If the load became greater than fifteen hundred pounds, the throw of the worm wheel B would cause the lever to move to the left, thus limiting the throw of the operating-bar O, as the throw would be limited by the stop N striking the bar J, and this would consequently reduce the speed of the elevator to correspond with the increased load, thus preventing the overloading of the electric motor or the overloading of the engine, if it be driven directly by an engine, or the overloading of the motive power, whatever it may be, and when the load is decreased the spring L returns lever J. As power exerted, is the load multiplied by the speed, if, therefore, when the load is increased I proportionately decrease the speed I bring the power multiplied by the speed always to constant. This may be used in any elevator, whether driven by the means to be hereinafter described in this particular device—to wit, an electric motor—or in any device for producing the power—that is, it may be used equally with a steam motor, an engine, or with a hydraulic motor, the purpose being simply to cause the speed multiplied by the power to be constant. As will be hereinafter described, if the elevator becomes too greatly overloaded, so as to reach the danger limit, the elevator will be stopped by the extreme movement of the bar O. In this case I could use a weighted lever in place of the spring, so that the lever J would remain inactive until the danger limit was reached, and when this occurs the weight would be overbalanced and the lever rendered active and would move the operating-bar, so as to stop the elevator. If desirable, an indicator could be placed in the car, so as to indicate the extent of the load—that is, the extent to which the load increases over the normal at which the lever is set—as shown at Fig. 5, in which $Z^{20}$ is an indicator in the car, having graduations. $z^{21}$ is a pivoted index-finger weighted at $z^{22}$. $z^{23}$ is a cord, one end connected to the indicator, and passes over pulleys $z^{24}$ $z^{25}$, and the other end is connected to index finger. $z^5$ is a bell-crank lever, one end connected to pulley $z^{25}$, and the other end connected to rod $z^6$, which rod in turn is connected to lever J. The bell-crank $z^5$ is fulcrumed at $z^7$. As the pulley $z^{25}$ is raised or lowered the index travels around its center and is brought opposite the different indicating-numbers, and the parts are so adjusted that the movement of lever J for an increase of load moves the index a distance to indicate the change.

In order to provide an automatic stop at each end of the travel of the elevator, I construct the operating sheave P so that it works in a thread on the drum-shaft A′, so that the movement of the drum-shaft moves the sheave upon said shaft. The hub of the operating-sheave is provided with the toothed portion $A^2$, and the drum-shaft A′ is provided with the toothed portion $A^3$, which are so adjusted that when the drum has received sufficient cable to bring the car to the end of its travel the operating-sheave has moved upon the shaft, so that the tooth on the sheave strikes the tooth on the shaft of the drum, and the sheave is revolved with the shaft, stopping the mechanism.

The speed of the elevator is increased or decreased by turning the sheave P, which in turn operates the operating bar Q, which operates the rack X in the gear Y, moving the lever Z, so as to move the friction-wheel D up and down the face of the friction-wheel C, the friction wheel C being held by the springs hereinbefore described in close contact with the friction wheel D. The operating-motor in this case is an electric motor, and is operated in the following manner: R is the electric motor which has the shaft R′ connected to it, which shaft is connected to the shaft of the friction-wheel D or forms the shaft for the friction-wheel D. The operation of this motor is as follows: Q is a resistance box interposed between the motor and the source of current-supply, and $R^2$ is the switch by means of which the current is turned on or off. The wires from the main circuit are connected to the brushes 1 1 and 2 2. S is a solenoid, the said solenoid being in electrical connection with the brushes 3 and 4, as clearly shown in the diagrammatical sketch. 5 and 6 are two contacts on the switch, the wire from 5 passing directly to the pole of the armature of the motor and the wire from 6 passing to the brush 8, and a wire passes from the other pole of the armature of the motor to the contact-plate 9. The brush 8 is insulated from and connected to the core of the solenoid and moves with said core. The main current also passes from one pole to the magnet of the electric motor and from the other pole to the brush 10. The other magnet of the electric motor is connected to the contact-plate 12. The brush 10 is connected to and insulated from the arm which carries the brush 8. 7 is an insulated plate upon which the brush 8 rests when the current is off. The switch $R^2$ is connected to the cam W, which is operated by two pins $w$, $w'$ on the operating-arm O. (See Fig. 9.) T is a lever which is connected to the arm 25, to which the brushes 10 and 8 are connected and to which the core of the solenoid is also connected, and U is a connecting-rod which connects the lever T with the rod V, said rod V being connected to the brake G, and these parts are so connected that the weight G normally holds the solenoid core in the position shown in drawings—that is, holds the solenoid core out of action. When the operator moves the operating-bar O through the medium of the cam W, the switch $R^2$ is moved so as to bring the contacts 1 1 and 2 2 (according to the direction in which the switch is moved) into contact with either the brush 5 or brush 6, and also to bring the brush 5 into connection with the brush 3 or 4. This allows the current to pass along the wire from 3 (supposing the switch to be turned to the left) through the magnet of the solenoid, electrifying said magnet and causing it to draw the core in. The current passes through the medium of the brush 5 to one pole of the armature of motor and through the medium of the brush 6 to the brush 8, through the resistance-coil to the contact-point 9, and through that to the other pole of the armature of the electric motor. As the brush 8 on the solenoid-core travels over the rheostat of the resistance the resistance becomes less and less until the brush 8 comes directly over the contact 9, when the current passes directly to the motor without passing through the resistance-coil. The field current is carried in the same manner by means of the wire 27, which passes to one of the magnets, and the other wire 28 passes to the brush 10, which is brought into contact with the contact-point 12, which contact-point 12 is electrically connected with the other magnet. (The speed with which the solenoid acts is governed by a dash pot consisting of a piston 120, connected to 25, the piston working in the cylinder 121, which is provided with a small air outlet 122.) The current is thus enabled to be carried onto the armature of the motor, gradually preventing any sudden influx of the current. When it is desired to stop the machine and turn off the current, the reverse occurs—that is to say, the lever T is provided with the projection 11, which is in the path of the projection 13 on the switch, and when the switch is reversed these parts are so adjusted that the point 13 comes in contact with the projection 11 before the contact-point 5 has passed beyond the brush 1, but after it has passed beyond the brush 3, (see Fig. 8) which will cause the current to be cut off from the solenoid-magnet, which will cause the weight of the brake F to pull back the solenoid core, and thus draw in the resistance with the armature before the reversal takes place and the further turning of the switch is prevented until the brush 7 reaches insulation 8, at which position the lever T has drawn the projection 11 out of line with the stop, and the operator can, if desired, reverse the switch (see dotted lines, Fig. 8)—that is, it will be impossible under this construction to change the direction of the motor without bringing it to a rest. In Fig. 7 I have shown the same operation with reverse current. To stop the motor, the operator turns or moves the bar O in the opposite direction, which moves the switch, so as to bring the brush 5 away from the brush 3, which causes the solenoid to drop back, bringing more and more resistance into the circuit until the brush 8 has reached the point 7, which is insulation, which will prevent any current passing through that way. The brush 10 also passes beyond the contact-plate, which will also throw the field-current out of electrical connection, and these brushes 5 and 6 are brought into the position shown in the drawings when the motor is at rest. By this connection of the solenoid core with the brake of the machine I am enabled to stop the machine whenever the current is cut off—that is, to make an automatic brake whenever the current is stopped.

In place of connecting the solenoid-magnet by means of the brushes 3 or 4, I can, if desired, connect the solenoid-magnet with the main current, as shown in the dotted lines 30. The projection 11 on the solenoid-core in this case would also prevent a reversal of the current until the solenoid core had returned to the position it assumes with the machine at rest.

The box which contains the switch and resistance coils may be covered with the door 200, so as to be entirely out of reach of the operator.

The advantages of this elevator are that there can be no possibility of harm from overloading, for if the machine be overloaded beyond the safety limit the lever J will push the pin which operates the switch $R^2$ and close the current, and it will also regulate the speed, so that the weight multiplied by the speed will be a constant, and prevent overloading of the machine in the sense of affecting the source of power, and this is especially good where a constant overloading might cause an extra current to pass through the armature and burn it out. Thus in using a constant-potential circuit great care has to be taken to prevent overloading the machine. In case of overloading when the power is thrown on the machine a surplus current rushes through the armature, and if it is not protected by a fusible plug, burns it out. If there is a fusible plug, the said plug is blown out, and, while no serious damage results, yet the elevator stops, and there is the inconvenience of replacing the plug, which the elevator-boy could hardly be intrusted with, and, as is well known, especially with freight elevators, it is almost impossible to prevent overloading. As far as this device for measuring the load, as it were, is concerned, as hereinbefore stated, it is equally applicable to elevators driven by steam-power or by hydraulic power, and it can be arranged to be attached to other parts of the machine than that shown and gives the same results. If desired, an indicator can be placed in the car in connection with it—that is, as far as this weighing or measuring device is concerned. I do not intend to limit myself to any particular type of elevator, except wherein the said weighing device is specifically so claimed. By the arrangement of the solenoid and switch apparatus the introduction of the current is automatically regulated, and there can be no danger of a sudden influx of the current caused by carelessness on the part of the operator, as it is necessary for the current to pass into the motor gradually through the resistance coils until the motor has reached its maximum capacity. The speed is also under the control of the operator, as he is enabled to move the friction-wheel D up and down upon the face of the friction-wheel C, thereby decreasing or increasing the speed as the load varies, so as to maintain a constant power.

By my mechanism I can start the machine with a reduced speed, and I thus do not require a heavier motor to start the apparatus than I need thereafter to operate it.

Instead of placing the switch adjacent to or in the resistance-box said switch might be placed in the car, and the wires could run direct from it to the resistance-box, the only difference being an increased length of wire.

In this application I have claimed only the electrical features of my invention and in a divisional application, Serial No. 497,813, filed January 23, 1894, I have claimed the mechanical features of my invention.

Having now fully described my invention, what I claim, and desire to protect by Letters Patent, is—

1. In combination, a switch, a second switch, a translating device, and circuit connections substantially as described whereby upon the closing by means of the first named switch of a circuit independent of the translating device, the second switch will be automatically operated to close the circuit to the translating device.

2. In combination, a switch, a second switch, a translating device, and circuit connections substantially as described whereby upon the closing by means of the first named switch of a circuit independent of the translating device, the second switch will be automatically operated to close the circuit to the translating device, and whereby upon the opening by means of the first named switch of said circuit independent of the translating device, said secondary switch will be automatically operated to open the circuit to the translating device.

3. The combination of a translating device, a switch, electric connection from said switch to the translating device, resistances in the circuit of the translating device, a second switch in said circuit, an arm for closing and opening said second switch, said arm being adapted to travel over said resistances and increase the amount or strength of current in the translating circuit, actuating mechanism for operating said arm, and means to throw said actuating mechanism in and out of action.

4. In combination, a switch, a second switch, a translating device, resistances, electrical connection between the resistances and the translating device, and other circuit connections substantially as described whereby upon the closing by means of a first named switch of a circuit independent of the translating circuit, the second switch will be automatically operated to close the circuit to said translating device through said resistances and gradually cut the same out of circuit, and means substantially as described whereby upon the opening by means of the first named switch of said circuit independent of the translating circuit, the second switch will be automatically operated to move back over and beyond said resistances to open the translating circuit.

5. The combination of a translating device, a switch, electric connection from said switch to the translating device, resistances in circuit with the translating device, a second switch in said circuit, an arm for closing said second switch said arm being adapted to travel over said resistances and increase the amount or strength of current in the translating circuit, a solenoid for operating said arm, electrical connection with said solenoid and a current controlling switch for said solenoid, whereby when said solenoid is rendered active the translating circuit is closed and said arm moved over said resistances to gradually cut the same out of circuit.

6. The combination of a translating device, a switch, electric connection from said switch to the translating device, resistances in circuit with the translating device, a second switch in said circuit, an arm for closing said second switch said arm being adapted to travel over said resistances and increase the amount or strength of current in the translating circuit, a solenoid for operating said arm, electrical connection with said solenoid and a current controlling switch for said solenoid, whereby when said solenoid is rendered active the translating circuit is closed and said arm moved over said resistances to gradually cut the same out of circuit, and means to return said arm to its initial position when the circuit to solenoid is broken.

7. The combination of a translating device, a switch, electric connection from said switch to the translating device, resistances in circuit with the translating device, a second switch in said circuit, an arm for closing said second switch said arm being adapted to travel over said resistances and increase the amount or strength of current in the translating circuit, a solenoid for operating said arm, electrical connection with said solenoid and a current controlling switch for said solenoid, whereby when said solenoid is rendered active the translating circuit is closed and said arm moved over said resistances to gradually cut the same out of circuit, means to return said arm to its initial position when the circuit to solenoid is broken, and means to retain the circuit to the translating device until the arm returns to its initial position.

8. In combination, a source of current supply, a switch, a translating device, circuit connections from said switch to the translating device, resistances in circuit with the translating device, a switch arm in said circuit adapted to make or break the circuit to the translating device and to travel over said resistances, a solenoid to actuate said arm, an electric connection between the switch and the solenoid whereby when the switch is operated the solenoid is energized and the switch arm automatically moved to close the circuit to the translating device and gradually increase the strength or amount of current in said circuit.

9. In combination, a source of current supply, a switch, a translating device, circuit connections from said switch to the translating device, resistances in circuit with the translating device, a switch arm in said circuit adapted to make or break the circuit to the translating device and to travel over said resistances, a solenoid to actuate said arm, and electric connection between the switch and the solenoid whereby when the switch arm is operated the solenoid is energized and the switch automatically moved to close the circuit to the translating device and gradually increase the strength or amount of current in said circuit, the switch being so constructed and disposed as to break the circuit to the solenoid before it breaks the circuit to translating device.

10. In combination, a source of current supply, a switch, a translating device, circuit connections from said switch to the translating device, resistances in circuit with the translating device, a switch arm in said circuit adapted to make or break the circuit to the translating device and to travel over said resistances, a solenoid to actuate said arm, and electric connection between the switch and the solenoid whereby when the switch is operated the solenoid is energized and the switch arm automatically moved to close the circuit to the translating device and gradually increase the strength or amount of current in said circuit, the switch being so constructed as to break the circuit to solenoid before it breaks the circuit to translating device, means to return said arm to its initial position when the circuit to solenoid is broken, and means to lock said switch when the circuit to the solenoid is broken until said arm returns to its initial position.

11. The combination with a translating device of a reversing switch for controlling the direction of current in the translating circuit, an arm for controlling the admission of current to the translating device, resistances in said circuit over which said arm is adapted to travel, and means for actuating said arm in one direction to make and means to return said arm to break said circuit, whereby the movement of the arm in one direction closes the circuit and gradually increases the amount or strength of current, and in the other direction decreases the amount of current and breaks said circuit, and connection with reversing switch independent of the translating circuit for controlling the movement of said arm in both directions from said reversing switch.

12. The combination with a translating device of a reversing switch for controlling the direction of current in the translating circuit, an arm for controlling the admission of current to the translating device, resistances in said circuit over which said arm is adapted to travel, and means for actuating said arm in one direction to make and means to return said arm to break said circuit whereby the movement of the arm in one direction closes the circuit and gradually increases the amount or strength of current, and in the other direction decreases the amount of current and breaks said circuit, and connection with reversing switch independent of the translating circuit for controlling the movement of said arm in both directions from said reversing switch, and means to prevent the reversal of current in translating circuit while said circuit is closed.

13. The combination with a translating device of a reversing switch for controlling the direction of current in the translating circuit, an arm for controlling the admission of current to the translating device, and means for actuating said arm in one direction to make and means to return said arm to break said circuit, whereby the movement of the arm in one direction closes the circuit, and in the other direction breaks said circuit and connection with reversing switch independent of the translating circuit for controlling the movement of said arm in both directions from said reversing switch.

14. The combination with a translating device of a reversing switch for controlling the direction of current in the translating circuit, an arm for controlling the admission of current to the translating device, and means for actuating said arm in one direction to make and means to return said arm to break said circuit, whereby the movement of the arm in one direction closes the circuit, and in the other direction breaks said circuit, and connection with reversing switch independent of the translating circuit for controlling the movement of said arm in both directions from said reversing switch and means to prevent the reversal of current in translating circuit while said circuit is closed.

15. In combination, an electric motor, an electric switch, means to operate said switch, brushes, as 5, 6, connected to said switch, contact-points, as 1 1 2 2, in electrical connection with the source of current supply and in the path of movement of brushes, an electrical connection directly from one of said brushes to the armature of the motor, a solenoid, a solenoid-core, a brush as 8, connected to and insulated from the core of said solenoid, electrical connection between said brush and the other of said brushes, a resistance in path of travel of the solenoid-core, a contact as 9, in electrical connection with said resistance, an electrical connection between said contact and the armature of motor, an electric connection between solenoid and the brushes, whereby when the switch is turned the solenoid is rendered active and draws the core in, causing the brush 8 to travel over the resistance and finally pass directly in contact with said contact point 9, and mechanism to draw out the solenoid core when the current is shut off.

16. In combination, an electric motor, an electric switch, means to operate said switch, brushes, as 5 6, connected to said switch, contacts, as 1 1 2 2, in electrical connection with the source of current supply and in the path of movement of brushes, an electrical connection directly from one of said brushes to the armature of the motor, a solenoid, a solenoid-core, a brush as 8 connected to and insulated from the core of said solenoid, electrical connection between said brush and the other of said brushes, a resistance in path of travel of the solenoid core, a contact as 9, in electrical connection with said resistance, an electrical connection between said contact and the armature of motor, an electric connection between solenoid, and the brushes 5 and 6, whereby when the switch is turned the magnet of the solenoid is rendered active and draws the core in, causing the brush 8 to travel over the resistance and finally pass directly in contact with said contact-point 9, a brake-wheel, a brake connected to said wheel provided with a weighted lever, and intermediate connection between said lever and the solenoid-core, whereby the lever draws out and holds the core at its most outward position when the current is off.

17. In combination, an electric motor, an electric switch means to operate said switch, brushes, as 5 6, connected to said switch, contacts, as 1 1 2 2, in electrical connection with the source of current supply and in the path of movement of brushes, an electric connection directly from one of said brushes to the armature of the motor, a solenoid, a solenoid-core, a brush as 8, connected to and insulated from the core of said solenoid, electrical connection between said brush and the other of said brushes, a resistance in path of travel of the solenoid-core, a contact as 9, in electrical connection with said resistance, an electrical connection between said contact and the armature of motor, an electric connection between solenoid and the brushes 5 and 6, an insulated plate, as 7, at the end of the outward travel of the solenoid-core, whereby when the switch is turned the magnet of the solenoid is rendered active and draws the core in, causing the brush 8 to travel over the resistance and finally pass directly in contact with said contact-point 9, and mechanism to draw out the solenoid-core when the current is shut off.

18. In combination, an electric motor, an electric switch, means to operate said switch, brushes as 5, 6, connected to said switch, contacts, as 1 1 2 2, in electrical connection with the source of current supply and in the path of movement of brushes, an electric connection directly from one of said brushes to the armature of the motor, a solenoid, a solenoid-core, a brush, as 8, connected to and insulated from the core of said solenoid, electrical connection between said brush and the other brushes, a resistance in path of travel of said solenoid-core, a contact, as 9, in electrical connection with said resistance, an electrical connection between said contact and the armature of motor, an electric connection between said solenoid and the brushes 5 and 6, a direct electric connection between the source of current supply and one magnet of motor, a contact-point plate, as 25, electric connection between said plate and the magnet of the motor, a lever connected to the core of the solenoid, a brush, as 10, carried by said lever, said plate being in line of travel of said brush, and electric connection between the brush 10 and source of current supply.

19. In combination, an electric motor, an electric switch, means to operate said switch, brushes, as 5 6, connected to said switch, contacts, as 1 1 2 2, in electrical connection with the source of current-supply and in the path of movement of said brushes, an electric connection directly from one of said brushes to the armature of the motor, a solenoid, a core of said solenoid, a brush, as 8, connected to and insulated from the core of said solenoid, electric connection between said brush 8 and the other brushes, resistance in path of travel of the solenoid-core, a contact as 9, in electrical connection with said resistance, an electrical connection between said contact and the armature of motor, an electric connection between solenoid and the brushes 5 and 6, whereby when the switch is turned the solenoid is rendered active and draws the core in, causing the brush 8 to travel over the resistance and finally pass directly in contact with said contact-point 9, and mechanism to draw out the solenoid-core when the current is shut off, a stop, as 13, connected to the switch, and a stop, as 11, connected to the solenoid-core, said stop 11 being in the path of movement of the stop 13 unless the solenoid-core is in its most outward position.

20. In combination, an electric motor, an electric switch, means to operate said switch, brushes as 5 6, connected to said switch, contacts, as 1 1 2 2, in electrical connection with the source of current supply and in the path of movement of brushes, an electric connection directly from one of said brushes to the armature of the motor, a solenoid, a solenoid-core, a brush, as 8, connected to and insulated from the core of said solenoid, electric connection between said brush and the other brushes, a resistance in path of travel of the solenoid-core, a contact, as 9, in electrical connection with said resistance, an electrical connection between said contact and the armature of motor, contacts, as 3 and 4, electrical connection between said contacts and the solenoid, electrical connection between said solenoid and brush 6, whereby, when the switch is turned, the solenoid is rendered active and draws the core in, causing the brush 8 to travel over the resistance and finally pass directly in contact with said contact-point 9, and mechanism to draw out the solenoid-core, when the current is shut off.

21. In combination. an electric motor, a source of current supply, connection between said source of current supply and the motor, an electric-current switch, an operating-bar, intermediate connection between said bar and the switch, stops upon said bar, a driving-worm, and a counterbalanced pivoted lever connected to said worm, the stops being in line of travel of said pivoted lever.

22. In combination, an electric motor, a source of current-supply, connection between said source of current supply and the motor, an operating-bar, a switch, intermediate connection between said bar and the switch, stops upon said bar, a driving shaft and a counterbalanced pivoted lever connected to said driving-shaft, the stops being in line of travel of said pivoted lever, whereby when said lever swings and strikes said stops the switch is operated to turn off the current.

In testimony of which invention I have hereunto set my hand.

FRANK E. HERDMAN.

Witnesses:
H. C. JOHNSON,
N. T. HARRINGTON.